Patented June 28, 1932

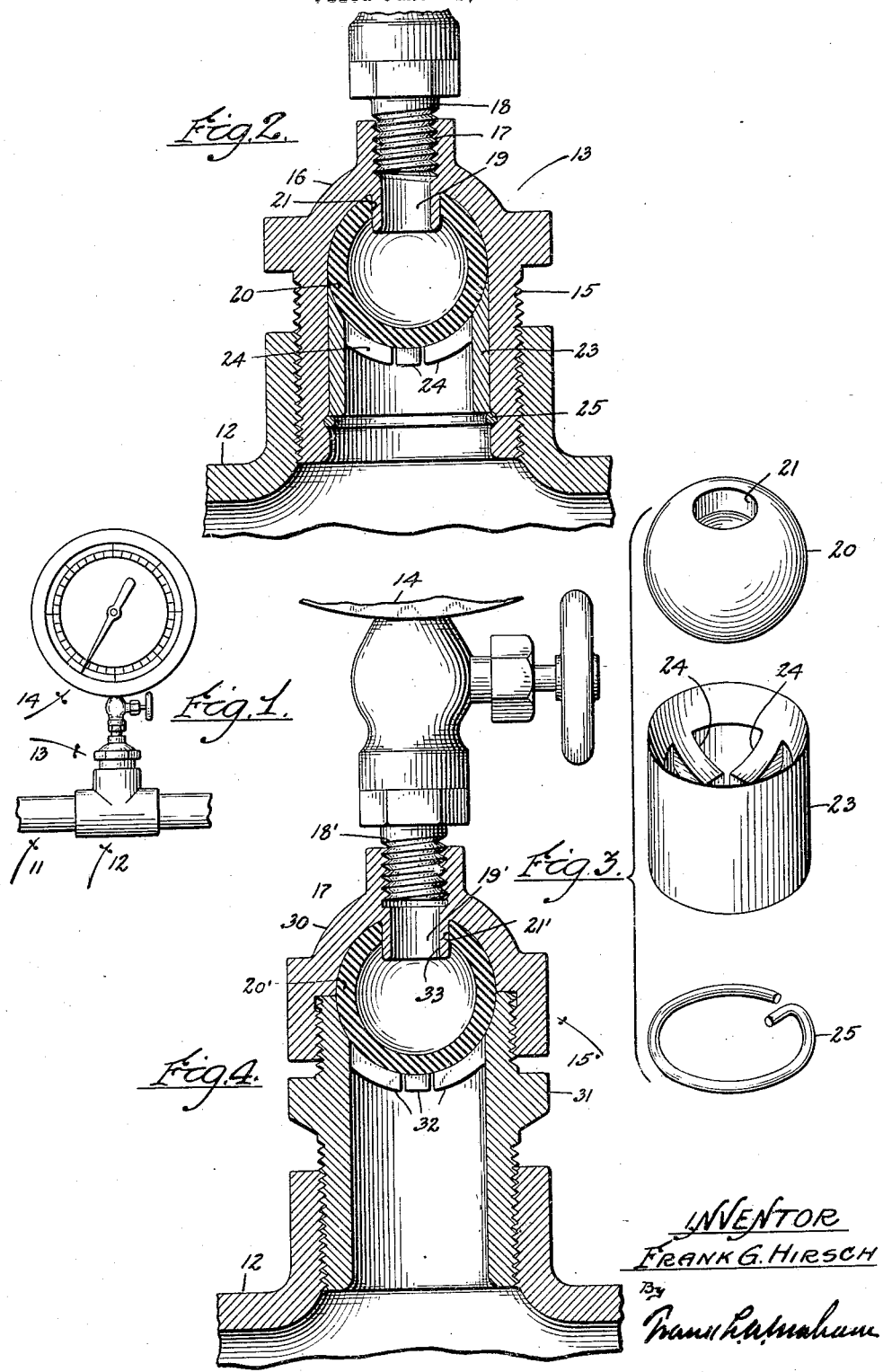

1,864,906

UNITED STATES PATENT OFFICE

FRANK G. HIRSCH, OF LOS ANGELES, CALIFORNIA, ASSIGNOR TO CHARLES G. BANKS, OF LOS ANGELES, CALIFORNIA

GAUGE PROTECTOR

Application filed June 11, 1930. Serial No. 460,403.

This invention has to do in a general way with pressure gauges and is more particularly related to gauge protectors adapted to protect such gauges from the corrosive or abrasive action of certain fluids in connection with which the gauges are used.

It is well known to those familiar with the art that pressure gauges as they are usually constructed consist of a spirally shaped elliptical tube of comparatively small cross sectional area which is associated through suitable mechanism with the gauge needle, such needle being positioned before a dial calibrated to indicate the pressures for which the particular gauge tube is designed. In measuring the pressure on certain corrosive fluids, such as acid or liquid containing acid, it has, in certain instances, been found extremely difficult to obtain a gauge tube which has the correct resilience and will at the same time resist the corrosive action of these fluids.

It is well known to those familiar with oil well drilling practice that certain of the fluids used in this industry, such as the circulating mud employed in the use of rotary drills and certain types of oil, tend to accumulate in the gauge tube and after a time render the gauge completely useless or effect its sensitiveness to a point at which it is no longer dependable.

It is the primary object of this invention to produce a device of simple form and construction which may be interposed between the gauge and the chamber containing the pressure fluid, and which is of a construction such that the pressure in the pressure chamber is transmitted indirectly to the gauge through a suitable diaphragm which in some instances may be associated with a non-corrosive fluid contained within the gauge above the diaphragm. In this manner the pressure fluid is kept out of the gauge tube, and the tube is thus protected against any clogging or corrosive action from such fluid.

It is a noteworthy feature of the device contemplated by this invention that the member referred to above as a diaphragm is made in the form of a hollow sphere which gives uniform transmission of pressure to the gauge chamber, and is constructed so that it is impossible for any of the so-called pressure fluid to enter the gauge chamber or the gauge tube.

Another noteworthy feature of the device contemplated by this invention resides in the construction of the pressure sphere so that it cannot be rotated from the proper position after the unit has once been assembled.

The general construction of the device contemplated by this invention consists merely of a housing which has a dome-like cover member adapted to receive a yieldable hollow sphere, the upper end of the sphere being provided with an aperture adapted to be aligned with an aperture in the cover member. The aperture in the cover member is adapted to receive the gauge stem. That portion of the housing immediately below the pressure sphere is provided with a supporting member which holds the sphere in place when there is no pressure applied to its outer surface.

The details in the construction of a preferred form of my invention, together with other objects attending its production, will be best understood from the following description of the accompanying drawing which is chosen for illustrative purposes only, and in which—

Fig. 1 shows a pressure chamber in the form of a pipe line which is equipped with a gauge and a preferred form of my invention;

Fig. 2 is a sectional elevation showing the details in the construction of a preferred form of my invention;

Fig. 3 is a detached perspective view showing the pressure sphere and sphere support used in that form of my invention shown in Fig. 2;

Fig. 4 is a sectional elevation similar to Fig. 2, showing a modified form of my invention.

More particularly describing the invention as herein illustrated, reference numeral 11 indicates a pipe line which will hereinafter be referred to as a pressure line or a pressure chamber, and which has interposed therein a T fitting 12, which receives a gauge protector 13, the latter member supporting a gauge 14. The details in the construction of the gauge protector 13 are best illustrated in Figs. 2 and 3, where the protector is shown as comprising a bushing or body 15 having a dome-like cover member 16. The cover 16 of the body has formed therein a passage 17, the upper end portion of which is threaded to receive the gauge stem 18 and the lower end portion of which extends downwardly into an inwardly projecting nipple 19 which projects below the upper rounded inner surface of the dome-like cover 16.

Reference numeral 20 indicates what I have termed a pressure sphere which may be formed of any yieldable material, such as rubber or rubber composition, and is of a nature such that it will resist the action of the material contained within the pressure chamber or pressure line 11. The pressure sphere 20 has an aperture 21 formed therein, such aperture being of a size and shape which will permit the reception of the inwardly or downwardly projecting nipple 19.

It will be apparent that when the pressure line 11 contains a fluid under considerable pressure, the pressure sphere 20 will be held in firm engagement with the lower surface of the housing 16. During the assembly of the unit, however, and during such time as there is no pressure fluid in the pressure line 11, it is necessary to have some means for supporting the sphere in the housing. In that form of my invention shown in Fig. 2, such means comprise a ring 23 which has provided in its upper end portion a rounded spider member 24. The ring is retained within the housing 15 by means of an extension ring 25 and the rounded spider provides a uniform supporting surface for the yieldable sphere and at the same time permits uniform application of pressure against the exposed surface of the sphere when the pressure line 11, contains a pressure fluid.

That form of my invention shown in Fig. 4 is substantially the same in all of its essential features as the form shown in Fig. 2. In this form of my invention the dome-like cover 30 of the body member 15' is threaded upon a special nipple 31. The upper end of the nipple 31 has formed therein a sphere supporting spider 32 and the upper inner surface of the cover 30 is provided with a downwardly projecting nipple 33 which extends into an aperture 21' formed in the pressure sphere 20'. The nipple 33, like the one described in connection with Fig. 2, contains a passage 19', the upper end portion of which is threaded to receive the lower threaded end portion of a gauge stem 18'.

It will be apparent from the foregoing description that the device contemplated by this invention is of simple form and construction and that any pressure which is present in the pressure line 11 and is acting against the spherical surface of the pressure sphere 20, is uniformly transmitted through such surface by the compression of the sphere so as to act directly upon the fluid contained within the gauge tube and the pressure sphere. This last mentioned fluid may be the air which is present when the unit is assembled, or it is preferably some non-compressible and non-corrosive fluid, such as glycerine or the like, which will give a more positive reaction in the gauge tube for low pressure readings.

It will be seen, therefore, that the device contemplated by this invention consists of a body comprising the housing 15 and a compressible hollow sphere 20, the interior of the sphere being in direct communication with the gauge tube and the exterior surface thereof being arranged so as to be acted upon by the pressure fluid.

It is to be understood that while I have herein described and illustrated one preferred form of my invention and have indicated certain modifications in the construction of the body member, that the invention is not limited to the precise construction described above, but includes within its scope whatever changes fairly come within the spirit of the appended claims.

I claim as my invention:

1. For use in combination with a pressure gauge, a protector embodying: a hollow body adapted for placement in a pressure line and provided with means for attachment to said gauge; a compressible member in said body in internal communication with said gauge and having its outer surface exposed to fluid in said pressure line; and means including a spider for holding said compressible member in said body.

2. For use in combination with a pressure gauge, a protector embodying: a hollow body adapted for placement in a pressure line and provided with means for attachment to said gauge; a compressible member in said body in internal communication with said gauge and having its outer surface exposed to fluid in said pressure line; and a spider and expansion ring for holding said compressible member in said body.

3. A gauge protector embodying: a body having a dome-like cover; an inwardly projecting nipple formed on said cover and provided with a passage adapted to receive a gauge stem; and a yieldable hollow sphere having an aperture adapted to receive said nipple and bear against said dome-like cover.

4. A gauge protector embodying: a body having a dome-like cover; an inwardly projecting nipple formed on said cover and provided with a passage adapted to receive a gauge stem; a yieldable hollow sphere having an aperture adapted to receive said nipple and bear against said dome-like cover; and means for supporting said sphere in said body against said cover.

5. A gauge protector embodying: a body having a dome-like cover; an inwardly projecting nipple formed on said cover and provided with a passage adapted to receive a gauge stem; a yieldable hollow sphere having an aperture adapted to receive said nipple; and means comprising a spider for supporting said sphere in said body.

In testimony whereof, I have hereunto set my hand at Los Angeles, California, this 3rd day of June, 1930.

FRANK G. HIRSCH.